United States Patent
Kodama

(10) Patent No.: US 8,719,387 B2
(45) Date of Patent: May 6, 2014

(54) ADJUSTING POLLING INTERVAL OF CLIENT WHEN ANOTHER CLIENT IS INPUTTING REQUEST TO SERVER

(75) Inventor: Junichi Kodama, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 694 days.

(21) Appl. No.: 12/890,525

(22) Filed: Sep. 24, 2010

(65) Prior Publication Data

US 2011/0119362 A1 May 19, 2011

(30) Foreign Application Priority Data

Nov. 13, 2009 (JP) ................................. 2009-260107

(51) Int. Cl.
  *G06F 15/177* (2006.01)
  *G06F 15/173* (2006.01)

(52) U.S. Cl.
  USPC .......................................... 709/221; 709/223

(58) Field of Classification Search
  USPC ...................... 709/223, 233, 221; 710/58, 60; 713/501–502
  See application file for complete search history.

(56) References Cited

U.S. PATENT DOCUMENTS

| | | | |
|---|---|---|---|
| 4,168,532 A * | 9/1979 | Dempsey et al. ................ | 710/60 |
| 5,935,211 A * | 8/1999 | Osterman ....................... | 709/228 |
| 7,159,036 B2 * | 1/2007 | Hinchliffe et al. ............ | 709/242 |
| 7,359,075 B2 * | 4/2008 | Kimura ........................ | 358/1.15 |
| 7,548,969 B2 * | 6/2009 | Tripp et al. ................... | 709/223 |
| 7,751,425 B2 * | 7/2010 | Shoji et al. .................... | 370/449 |
| 7,872,771 B2 * | 1/2011 | Kojima et al. ................ | 358/1.15 |
| 2004/0221035 A1 * | 11/2004 | Morikawa ..................... | 709/224 |
| 2005/0268176 A1 * | 12/2005 | Yokokura ....................... | 714/43 |
| 2006/0192997 A1 * | 8/2006 | Matsumoto et al. ......... | 358/1.15 |
| 2008/0170585 A1 | 7/2008 | Shoji | |
| 2011/0119362 A1 * | 5/2011 | Kodama ........................ | 709/223 |

FOREIGN PATENT DOCUMENTS

| | | |
|---|---|---|
| CN | 1485727 A | 3/2004 |
| CN | 1859184 A | 11/2006 |
| JP | 2004-080187 A | 3/2004 |
| JP | 2005-309891 A | 11/2005 |

* cited by examiner

*Primary Examiner* — Lance L Barry
(74) *Attorney, Agent, or Firm* — Canon USA, Inc., IP Division

(57) ABSTRACT

A method for controlling acquisition of an occurred event that occurs in a network system due to the network system executing processing as requested by a request apparatus configured to request execution of the processing via a network, wherein the network system notifies an acquisition apparatus via the network about the occurred event, and wherein the acquisition apparatus is configured to acquire the occurred event, includes determining whether the request apparatus is in process of inputting a request to execute the processing, and setting, if it is determined that the request apparatus is in process of inputting the request to execute the processing, a set interval for the acquisition apparatus to acquire the occurred event, wherein the set interval is shorter than an interval that is set if it is determined that the request apparatus is not in process of inputting the request to execute the processing.

14 Claims, 13 Drawing Sheets

FIG. 3A

| REGISTERED APPLICATION | UTILIZED SERVICE | TIME OF LAST RECEIVED INPUT | USER OPERATION STATUS |
|---|---|---|---|
| APPLICATION 001 | SERVICE 001 | T01 | INPUT IN PROCESS |
| APPLICATION 002 | SERVICE 002 | T02 | WAITING FOR INPUT |
| ... | ... | ... | ... |

| REGISTERED SERVICE | USING CLIENT | TIME OF LAST NOTIFICATION | CLIENT OPERATION STATUS | SERVICE OPERATION STATUS |
|---|---|---|---|---|
| SERVICE 001 | CLIENT 001 | T01 | INPUT IN PROCESS | IN EXECUTION |
|  | CLIENT 002 | T02 | WAITING FOR INPUT |  |
|  | ... | ... | ... |  |
| SERVICE 002 | CLIENT 001 | T03 | WAITING FOR INPUT | WAITING FOR EXECUTION |
|  | CLIENT 004 | T04 | WAITING FOR INPUT |  |
|  | ... | ... | ... |  |

```
<soap:Envelope>
    <soap:Header>
        <wsa:Action> http://... </wsa:Action>
        <wsa:MessageID> uuid:... </wsa:MessageID>
        <ex:PollingInfo>
            <ex:ServiceInfo>
                <ex:ServiceID> service_no1 </ex:ServiceID>
                <ex:PollingInterval> 100ms </ex:PollingInterval>
            </ex:ServiceInfo>
        </ex:PollingInfo>
    </soap:Header>
    <soap:Body>
        <service:Evevt> event_data </service:Evevt>
    </soap:Body>
</soap:Envelope>
```

FIG. 11

| SERVICE OPERATION STATUS | USER OPERATION STATUS | SERVICE PRIORITY | POLLING FREQUENCY |
|---|---|---|---|
| IN EXECUTION | ACQUISITION IN PROCESS | HIGH | T01 |
| | | MIDDLE | T02 |
| | | LOW | T03 |
| | WAITING FOR ACQUISITION | HIGH | T04 |
| | | MIDDLE | T05 |
| | | LOW | T06 |
| WAITING FOR EXECUTION | ACQUISITION IN PROCESS | HIGH | T07 |
| | | MIDDLE | T08 |
| | | LOW | T09 |
| | WAITING FOR ACQUISITION | HIGH | T10 |
| | | MIDDLE | T11 |
| | | LOW | T12 |

ADJUSTING POLLING INTERVAL OF CLIENT WHEN ANOTHER CLIENT IS INPUTTING REQUEST TO SERVER

BACKGROUND OF THE INVENTION

1. Field of the Invention

The present invention relates to an event acquisition control method, an acquisition apparatus configured to acquire an event, and a processing apparatus configured to notify an event.

2. Description of the Related Art

Conventionally, there is a network system which shares an event among clients. More specifically, suppose that a specific client has executed a service on a server, which is connected with the client via a network and that another client acquires an event that occurs in relation to the service from the server. In this case, the client that acquires the event acquires a desired event by executing polling, i.e., by periodically giving an inquiry to the server.

In acquiring data by polling, in order to acquire the data at real time as precisely as possible, it is necessary to execute inquiries to the server at intervals as short as possible. However, in this case, a communication load may increase. In order to solve the above-described problem, Japanese Patent Application Laid-Open No. 2004-080187 discusses a method in which a server calculates an optimum timing for next polling based on a record of communication by a client and notifies the client of the calculated optimum polling timing.

In the conventional method described above, the polling interval or the polling timing is determined according to system management information previously registered on a server or a client, such as a schedule or a communication status. However, if processing has been started by a user operation, the conventional control method cannot execute polling control according to the user operation.

SUMMARY OF THE INVENTION

The present invention relates to a method for acquiring an event at real time and for reducing a load of event acquisition processing.

According to an aspect of the present invention, a method allows controlling acquisition of an occurred event. The occurred event occurs in a network system due to the network system executing processing as requested by a request apparatus. The request apparatus requests execution of the processing via a network. The network system notifies an acquisition apparatus via the network about the occurred event. The acquisition apparatus acquires the occurred event. The method includes determining whether the request apparatus is in process of inputting a request to execute the processing. If it is determined that the request apparatus is in process of inputting the request to execute the processing, then the method sets a set interval for the acquisition apparatus to acquire the occurred event. The set interval is shorter than an interval that is set if it is determined that the request apparatus is not in process of inputting the request to execute the processing.

According to another aspect of the present invention, an acquisition apparatus acquires an occurred event that occurs due a processing apparatus executing processing as requested by a request apparatus via a network. The acquisition apparatus includes a determination unit and a setting unit. The determination unit determines whether the request apparatus is in process of inputting a request to execute the processing. If it is determined that the request apparatus is in process of inputting the request to execute the processing, then the setting unit sets a set interval to acquire the occurred event. The set interval is shorter than an interval that is set if it is determined that the request apparatus is not in process of inputting the request to execute the processing.

According to yet another aspect of the present invention, a processing apparatus executes processing as requested by a request apparatus. The request apparatus requests execution of the processing via a network and the processing apparatus notifies an acquisition apparatus via the network of an occurred event that occurs due to execution of the processing. The processing apparatus includes a determination unit and an instruction unit. The determination unit determines whether the request apparatus is in process of inputting a request to execute the processing. If it is determined that the request apparatus is in process of inputting the request to execute the processing, then the instruction unit instructs the acquisition apparatus to set a set interval for the acquisition apparatus to acquire the occurred event. The set interval is shorter than an interval that is set if it is determined that the request apparatus is not in process of inputting the request to execute the processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 3A and 3B illustrate an example of information managed by a service execution apparatus and a service management apparatus.

FIG. 11 illustrates an example of a polling interval setting table, which is used for setting a polling frequency by the event acquisition apparatus according to the exemplary embodiment of the present invention.

DESCRIPTION OF THE EMBODIMENTS

Various exemplary embodiments, features, and aspects of the invention will be described in detail below with reference to the drawings.

Figure 1:
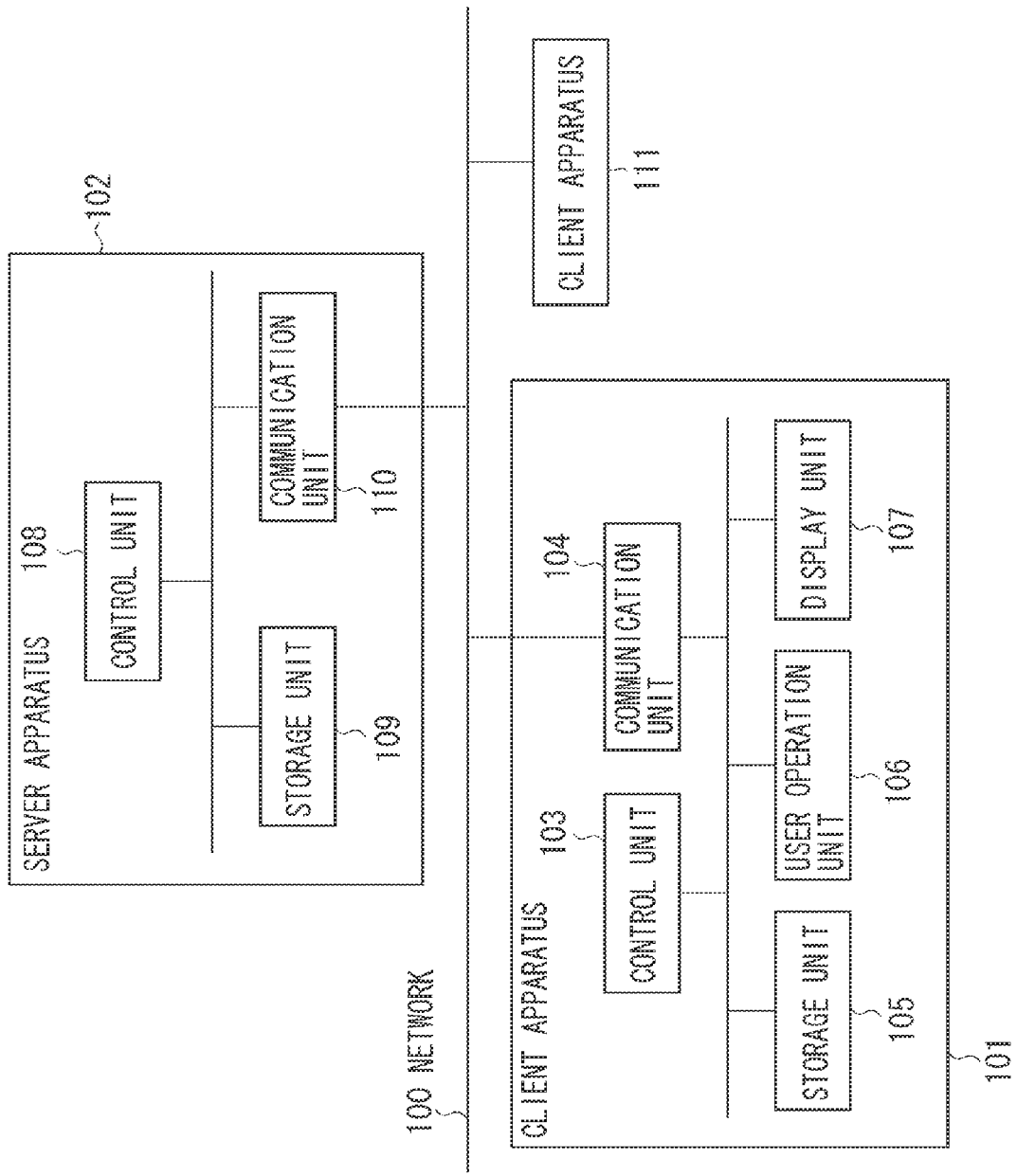
FIG. 1 illustrates an exemplary hardware configuration of an event share system according to an exemplary embodiment of the present invention.

FIG. 1 illustrates an exemplary hardware configuration of a network system according to an exemplary embodiment of the present invention. Referring to FIG. 1, a client apparatus 101 and a server apparatus 102 are in communication with each other via a network 100. Any communication method capable of executing communication by a message, such as wide area network (WAN) or local area network (LAN), can be used as the network 100. Additional client apparatuses, such as client apparatus 111, may participate in communication with other apparatuses via the network 100.

The client apparatus 101 includes a control unit 103, a communication unit 104, a storage unit 105, a user operation unit 106, and a display unit 107. Additional client apparatuses, such as client apparatus 111, may include similar units and a central processing unit (CPU) may include at least one of the control unit 103, the communication unit 104, the storage unit 105, the user operation unit 106, and the display unit 107. The client apparatus 101 can function as either a service execution apparatus configured to execute a service on the server apparatus 102 or an event acquisition apparatus configured to acquire an event that occurs in relation to a service from the server apparatus 102.

The control unit 103 executes processing by each processing unit included in the client apparatus 101, such as processing units 104, 106 and 107. The communication unit 104 includes an interface for executing communication via the network 100 and controls communication with the server apparatus 102. The storage unit 105 is a storage device that can function as a work area and a data storage area for each processing unit of the client apparatus 101. The user operation unit 106 is an input device for receiving an operation by a user. More specifically, the user operation unit 106 includes a mouse, a keyboard, or the like. The display unit 107 is an output device for displaying a result of processing by the client apparatus 101 on a screen. More specifically, the display unit 107 includes a liquid crystal display (LCD).

The server apparatus 102 includes a control unit 108, a storage unit 109, and a communication unit 110. A central processing unit may include at least one of the control unit 108, the storage unit 109, and the communication unit 110. The control unit 108 executes processing by each processing unit included in the server apparatus 102, such as communication unit 110. The server apparatus 102 is a processing apparatus configured to process a request from the client apparatus 101. The storage unit 109 is a storage device that can function as a work area and a data storage area for each processing unit of the server apparatus 102. The communication unit 110 includes an interface for executing communication via the network 100, and controls communication with the client apparatus 101.

Figure 2:
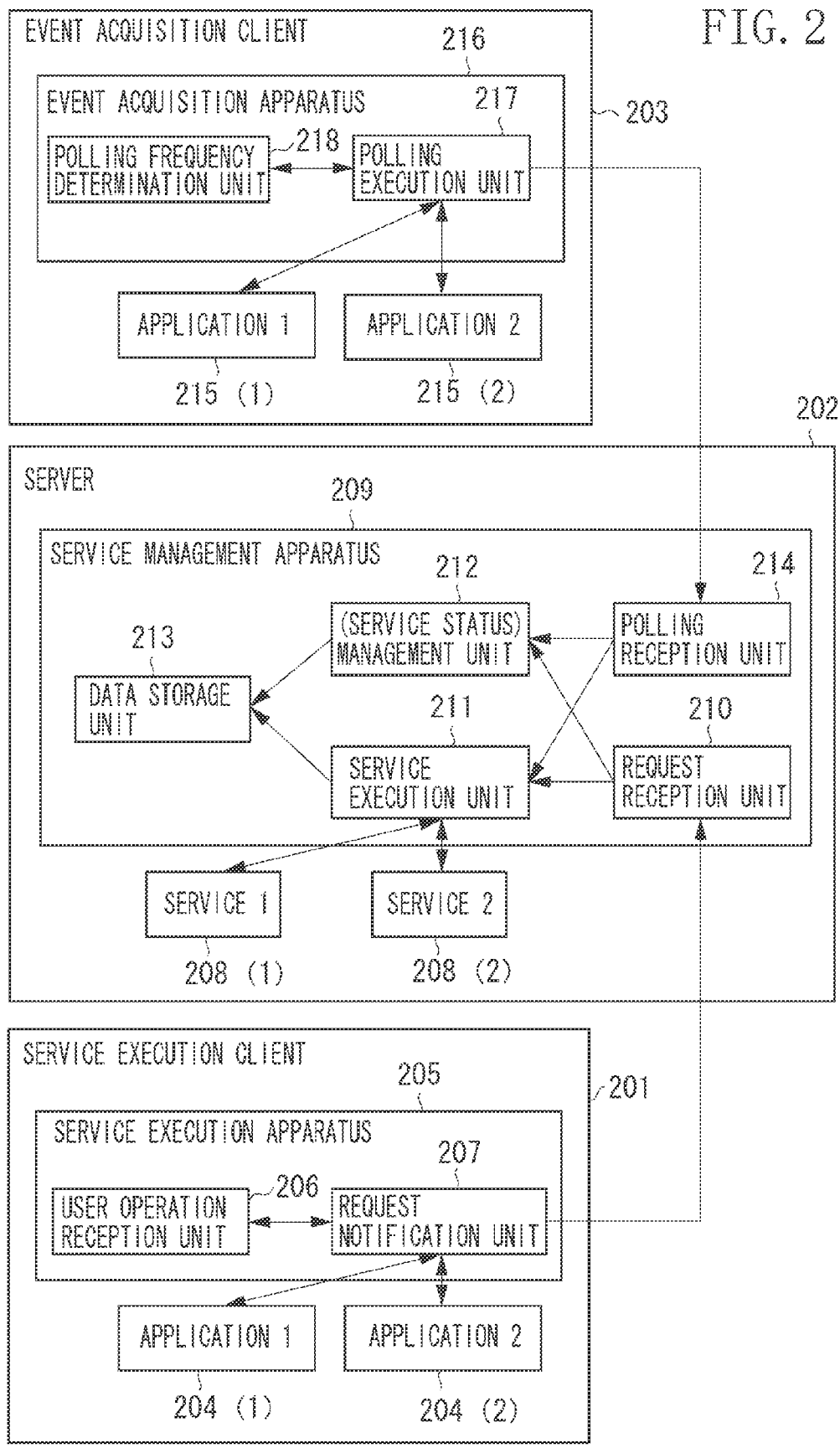
FIG. 2 illustrates an exemplary software configuration of the event share system according to the exemplary embodiment of the present invention.

FIG. 2 illustrates an exemplary software configuration of a network system according to a first exemplary embodiment of the present invention. Referring to FIG. 2, a configuration of each of a service execution client 201 and an event acquisition client 203 is an exemplary software configuration of the client apparatus 101 illustrated in FIG. 1. On the other hand, a configuration of a server 202 is an exemplary software configuration of the server apparatus 102 illustrated in FIG. 1. The service execution client 201, the server 202, and the event acquisition client 203 are connected to one another via the network 100. In another example, client apparatus 101 may function as the service execution apparatus 201 configured to execute a service on the server 202, client apparatus 101 may function as the event acquisition apparatus 203 configured to acquire an event that occurs in relation to a service from the server 202. In a further example, client apparatus 101 may function as the event acquisition apparatus 203 and client apparatus 111 may function as the service execution apparatus 201. A central processing unit may include at least one of the service execution client 201, the server 202, and the event acquisition client 203.

In the example, each of the service execution client 201 and the event acquisition client 203 is implemented by the control unit 103 of the client apparatus 101 by executing a program stored on the storage unit 105. The server 202 is implemented by the control unit 108 of the server apparatus 102 by executing a program stored on the storage unit 109. The control units 103 and 108 are computers. The storage units 105 and 109 store a program which is read by the control units 103 and 108 to implement the configuration illustrated in FIG. 2. In the present exemplary embodiment, an event occurs when the service execution client 201 executes a service on the server 202. The event acquisition client 203 acquires the occurred event by executing polling. The server 202 executes processing requested by the service execution client 201 and notifies the event acquisition client 203 of the event including a result of the processing.

Both the service execution client 201 and the event acquisition client 203 may exist within the same client apparatus illustrated in FIG. 1. More specifically, a plurality of the client apparatuses, including the client apparatus 101 and the client apparatus 111 (FIG. 1), which are connected to the network 100, include both the service execution client 201 and the event acquisition client 203.

Among the plurality of the client apparatuses, the client apparatus 101 requests execution of a service 208 provided by the server 202 while operating as the service execution client 201. On the other hand, the client apparatus 111 connected to the network 100 operates as an event acquisition client 203. The client apparatus 101 operating as the service execution client 201 operates also as an event acquisition client 203 and acquires an event that occurs on the server 202.

A service execution apparatus 205 is a request apparatus configured to request execution of a service. The service management apparatus 209 is a service execution apparatus configured to execute a service requested by the service execution apparatus 205 via the network 100. An event acquisition apparatus 216 is an event request apparatus (acquisition apparatus) that requests acquisition of an event that occurs due to execution of a service.

The service management apparatus 209 notifies the event acquisition apparatus 216 of the event requested via the network 100. The service execution apparatus 205, the service management apparatus 209, and the event acquisition apparatus 216 are connected to the network 100. The service management apparatus 209 notifies the event acquisition apparatus 216 via the network 100 of the event requested from the event acquisition apparatus 216 via the network 100.

The service 208 is a minute generation service, for example. An application 204 included in the service execution client 201 is a minute input application, for example. An application 215 included in the event acquisition client 203 is a minute display application. The minute input application and the minute display application may be configured as functions that are implemented by the same minute application. The service 208 is a kind of an application. The server 202 notifies the event acquisition client of an event including a result of processing by the application of the service 208.

Now, an exemplary method for controlling acquisition of an event according to the present exemplary embodiment will be described in detail below with reference to FIG. 2.

The service execution client 201 includes the service execution apparatus 205 which executes a service on the server 202 according to a user operation executed using the application 204. On the service execution apparatus 205, a user operation reception unit 206 which is configured to receive an input by a user operation for executing a service determines a status of a current (user) operation for each application. More specifically, the user operation reception unit 206 determines which of states "input in process" or "waiting for input" the current operation status is for each application.

The user operation reception unit 206 receives the user operation from the user operation unit 106 illustrated in FIG. 1. If the user operation status is "input in process", the user operation reception unit 206 periodically notifies the server 202 that the input is in process via a request notification unit 207. In the present exemplary embodiment, "input in process" refers to a state in which a user operation for executing a service has been executed using the application. On the other hand, "waiting for input" refers to a state in which such user operation has not been executed.

The request notification unit 207 notifies a request message for executing a service. When a user operation for executing a service which is executed using the application 204 is finally input, the request notification unit 207 notifies the server 202 of a service execution request. More specifically, the request notification unit 207 notifies the server 202 via the communication unit 104 in FIG. 1 of the service execution request.

Information managed by the user operation reception unit 206 which determines an operation status includes, for example, utilized service information 302, time of last received input 303, and an operation status 304 which are managed for each registered application 301 as illustrated in FIG. 3A. The information managed by the user operation reception unit 206 is stored on the storage unit 105 illustrated in FIG. 1. The registered application 301 is information about the application 204 which has been installed on the service execution client and registered on the service execution apparatus 205.

The utilized service information 302 is information about a service utilized by the application 204. The time of last received input 303 is information about the time when a last input of an operation by a user of the application 204 performed for executing a service is received. The operation status 304 is information about an operation status determined by the user operation reception unit 206.

The server 202 includes the service management apparatus 209 which executes the service 208 in response to the service execution request from the service execution client 201. On the service management apparatus 209, a request reception unit 210 receives the service execution request from the service execution client 201 and gives an instruction for executing the service to a service execution unit 211. Further, the request reception unit 210 notifies a (service state) management unit 212 of the operation status received from the service execution client 201. The request reception unit 210 receives information from the service execution client 201 via the communication unit 110.

The service execution unit 211 executes the service 208 according to an instruction from the request reception unit 210. In addition, the service execution unit 211 stores and manages event information generated as a result of executing the service 208 on a data storage unit 213. The data storage unit 213 is provided within the storage unit 109 (FIG. 1). The server 202 is a processing apparatus configured to process a request from the service execution client 201.

The management unit 212 sets a current operation status ("in execution" or "waiting for execution") for each service according to an operation status notified by the request reception unit 210. The current operation status is set within the storage unit 109 (FIG. 1). In the present exemplary embodiment, the state "in execution" refers to a state in which a service execution client that is currently processing an input for a service exists. On the other hand, the state "waiting for execution" refers to a state in which no service execution client is currently processing an input for a service. More specifically, the state "input in process" refers to a state in which the user is currently executing processing for inputting data to be notified to the service 208. The user operation reception unit 206 receives the data input by the user.

The management unit 212 determines whether the service execution apparatus 205 is currently in execution of an input for requesting execution of the service. If it is determined that the service execution apparatus 205 is currently in execution of an input for requesting execution of the service, then the management unit 212 sets the operation status of the service to "in execution". The management unit 212 manages a client that currently utilizes a service. In addition, the management unit 212 manages the operation status of each client (i.e., "input in process" or "waiting for input").

A polling reception unit 214 receives polling for acquiring an event from the event acquisition client 203. The polling reception unit 214 receives polling via the communication unit 110 in FIG. 1. After acquiring polling, the polling reception unit 214 acquires event information which is managed by the service execution unit 211 and an operation status which is managed by the management unit 212. In addition, the polling reception unit 214 adds the information to a message and gives a reply.

The service management apparatus 209 sets a polling interval to the event acquisition client 203 according to the operation status. More specifically, if it is determined that the service execution apparatus 205 is in process of the input for requesting execution of the service, the service management apparatus 209 sets an interval of request for acquisition of the event given by the event acquisition apparatus 216 shorter than an interval of request for acquisition of the event that is set if it is determined that the service execution apparatus 205 is not in process of the input for requesting execution of the service.

If the service 208 is the minute generation service and if the application 215 of the event acquisition client 203 is the minute display application, the following operation is executed. More specifically, the polling reception unit 214 receives polling from the event acquisition client 203. Then, the polling reception unit 214 transmits a minute to be displayed by the event acquisition client 203 using the minute display application and an operation status of the service execution client 201 to the event acquisition client 203. The minute to be displayed by the minute display application is event information.

Information managed by the management unit 212 which determines the operation status is, for example, information for each registered service 401 which is illustrated in FIG. 3B. In other words, the information managed by the management unit 212 includes using client information 402, time of receipt of last notification 403, client operation status information 404, and an operation status 405.

A registered service 401 which is deployed to the server is information about the service 208 that is registered to the service management apparatus 209. The using client information 402 is information about the service execution client 201 which utilizes the service 208. The time of receipt of last notification 403 is information about the last time of receipt of a notification message describing the operation status which is transmitted from the service execution client 201 that uses the service 208. The client operation status information 404 is information about the operation status of each client. The operation status 405 is information about the operation status determined by the management unit 212.

In the present exemplary embodiment, a plurality of executable services 208 exists on the network 100. Accordingly, the management unit 212 determines whether the service execution apparatus 205 is in process of input for requesting execution of the service for each service. The management unit 212 sets an interval of request of acquisition of an event, which occurs due to execution of the service for which the service execution apparatus 205 has been determined to be in process of the input for requesting execution of the service, shorter than an interval of request of acquisition of an event when it is determined that the service execution apparatus 205 is not currently in process of an input.

In the example illustrated in FIG. 3B, a plurality of service execution clients 201 (or a plurality of service execution apparatuses 205 as the request apparatus) exists on the network 100. In this case, the service management apparatus 209 determines whether at least one of the plurality of service execution apparatuses 205 is in process of the input for requesting execution of the service. If it is determined that at least one of the plurality of service execution apparatuses 205 is in process of the input, the service management apparatus 209 sets the interval of request of acquisition of the event given by the event acquisition apparatus 216 shorter than an interval of request of acquisition of the event that is set if it is determined that all the service execution apparatuses 205 are not in process of the input for requesting execution of the service.

The event acquisition client 203 includes the event acquisition apparatus 216 which acquires the event from the server 202 by executing polling and notifies the application 215 of the event. On the event acquisition apparatus 216, a polling execution unit 217 executes polling to the management unit 212 according to a polling frequency which is determined by a polling frequency determination unit 218. In addition, the event acquisition apparatus 216 acquires the event that occurs due to the service on the server 202. The polling execution unit 217 executes polling and acquires the event via the communication unit 104 illustrated in FIG. 1. Further, the polling execution unit 217 notifies the application 215 of the event information that has been added to a message of reply to the polling. Moreover, the polling execution unit 217 notifies the polling frequency determination unit 218 of the operation status.

The polling frequency determination unit 218 sets the polling frequency based on the received notification of the operation status. More specifically, the polling frequency determination unit 218 determines whether the service execution apparatus 205 is in process of the input for requesting execution of the service. If it is determined that the service execution apparatus 205 is in process of the input for requesting execution of the service, the polling frequency determination unit 218 sets an interval of request of acquisition of the event shorter than an interval of request of acquisition of an event that is set if it is determined that the service execution apparatus 205 is not in process of the input for requesting execution of the service. The event acquisition apparatus 216 is an event request apparatus (acquisition apparatus) configured to request acquisition of an event that occurs due to execution by the service management apparatus 209 of a service requested by the service execution apparatus 205.

The polling execution unit 217 controls a polling interval according to the polling frequency set by the polling frequency determination unit 218. More specifically, the polling execution unit 217 sets a short polling interval for a service whose polling frequency is high. On the other hand, the polling execution unit 217 sets a long polling interval for a service whose polling frequency is low. In the control, the polling interval for each of a plurality of services is set independently from one another. For example, it is useful to set an interval of 0.1 second as the polling frequency for the service whose polling frequency is high. On the other hand, it is useful to set an interval of ten seconds as the polling frequency for the service whose polling frequency is low.

The polling execution unit 217 controls an allocation of polling according to the polling frequency. To paraphrase this, the polling execution unit 217 sets a large allocation to the service whose polling frequency is high while setting a small allocation to the service whose polling frequency is low. In the control, the polling execution unit 217 executes polling to any one of the plurality of services at a predetermined interval of 0.04 seconds, for example. Further, in determining to which service polling is to be executed, the polling execution unit 217 prioritizes the service whose polling frequency is high. More specifically, the management unit 212 sets a frequency of request of acquisition of the event that occurs due to execution of the service which is determined as in process of the input for requesting execution of the service by the service execution apparatus 205 higher than a frequency of request of acquisition of the event that occurs due to execution of the service which is not in process of the input by the service execution apparatus 205.

In the present exemplary embodiment, either one of or a combination of two of the above-described controls is used. In other words, if one or two services whose polling frequency is high exist, the present exemplary embodiment executes the former control. On the other hand, if three or more services whose polling frequency is high exist, the present exemplary embodiment executes the latter control.

Figure 4:
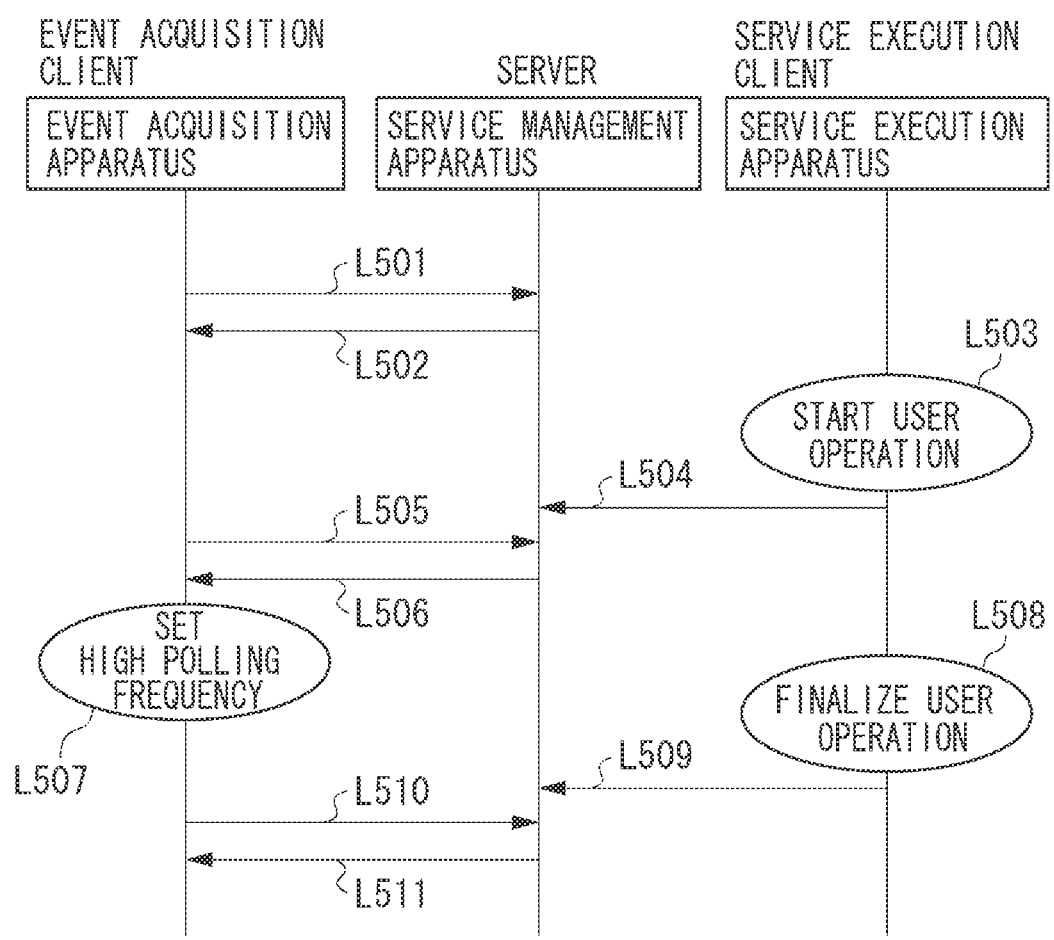
FIG. 4 illustrates an exemplary flow of processing executed by each apparatus included in a system according to the exemplary embodiment of the present invention.

FIG. 4 illustrates an exemplary flow of processing executed by each apparatus included in the network system according to the present exemplary embodiment. In the example illustrated in FIG. 4, the service execution apparatus 205 is a request apparatus configured to request execution of a service. The service management apparatus 209 is a service execution apparatus configured to execute a service requested by the service execution apparatus 205 via the network 100. The event acquisition apparatus 216 is an event request apparatus (acquisition apparatus) configured to request acquisition of an event that occurs due to execution of the service.

Referring to FIG. 4, in L501, the event acquisition client 203 which includes the event acquisition apparatus 216 periodically executes polling to the server 202 which includes the service management apparatus 209 in order to acquire an event that occurs due to execution of a service. In the present exemplary embodiment, it is supposed that the polling frequency as low as ten seconds is set.

After polling is received, the server 202 replies information about the event to be notified and an operation status. However, if no event to be notified exists, the message to be transmitted includes the operation status only. In L502, because no client whose operation status is "input in process" currently exists, the operation status of the service is set to "waiting for execution". Further, it is supposed that the polling frequency of the service whose operation status is "waiting for execution" is remained at the low setting value.

In L503, the service execution client 201 which includes the service execution apparatus 205 receives an input of a user operation for executing the service. In L504, the service execution client 201 notifies the server 202 that the operation status of the execution target service is "input in process" using the request notification unit 207.

After receiving the notification, the server 202 sets the operation status of the service to "in execution". In other words, the management unit 212 determines whether the service execution apparatus 205 is in process of the input for requesting execution of the service. If it is determined that the service execution apparatus 205 is in process of the input for requesting execution of the service, then the management unit 212 sets the operation status of the service to "in execution".

While the operation status is "input in process", the service execution client 201 periodically notifies the server 202 of the operation status ("input in process") (which is not illustrated in FIG. 4). When a client starts using a service, the service management apparatus 209 manages information describing that the client is currently using the service and the operation status of the client with using the management unit 212.

In L505, the event acquisition client 203 executes polling to the server 202. In L506, the server 202 transmits a message including the operation status in reply to the polling. After receiving the reply message, in L507, the event acquisition client 203 sets the polling frequency as high as 0.1 second, for example, of the service whose operation status is "in execution". More specifically, if it is determined that the service execution apparatus 205 is in process of the input for requesting execution of the service, an interval of request for acquisition of the event given by the event acquisition apparatus 216 is set shorter than an interval of request for acquisition of the event that is set if it is determined that the service execution apparatus 205 is not in process of the input for requesting execution of the service.

In L508, the service execution client 201 finalizes the input by the user operation for executing the service. In L509, the service execution client 201 notifies the server 202 of a service execution request. After receiving the service execution request, the server 202 executes the corresponding service and an event occurs due to the executed service. In L510, the event acquisition client 203 executes polling to the server 202. The polling in L510 is executed at the polling frequency set at the high value in L507. In L511, the server 202 transmits a message including event information in reply to the polling.

Then, the server 202 transmits a result of the executed service to the service execution client 201 in reply to the polling where necessary (not illustrated in FIG. 4).

Figure 5:
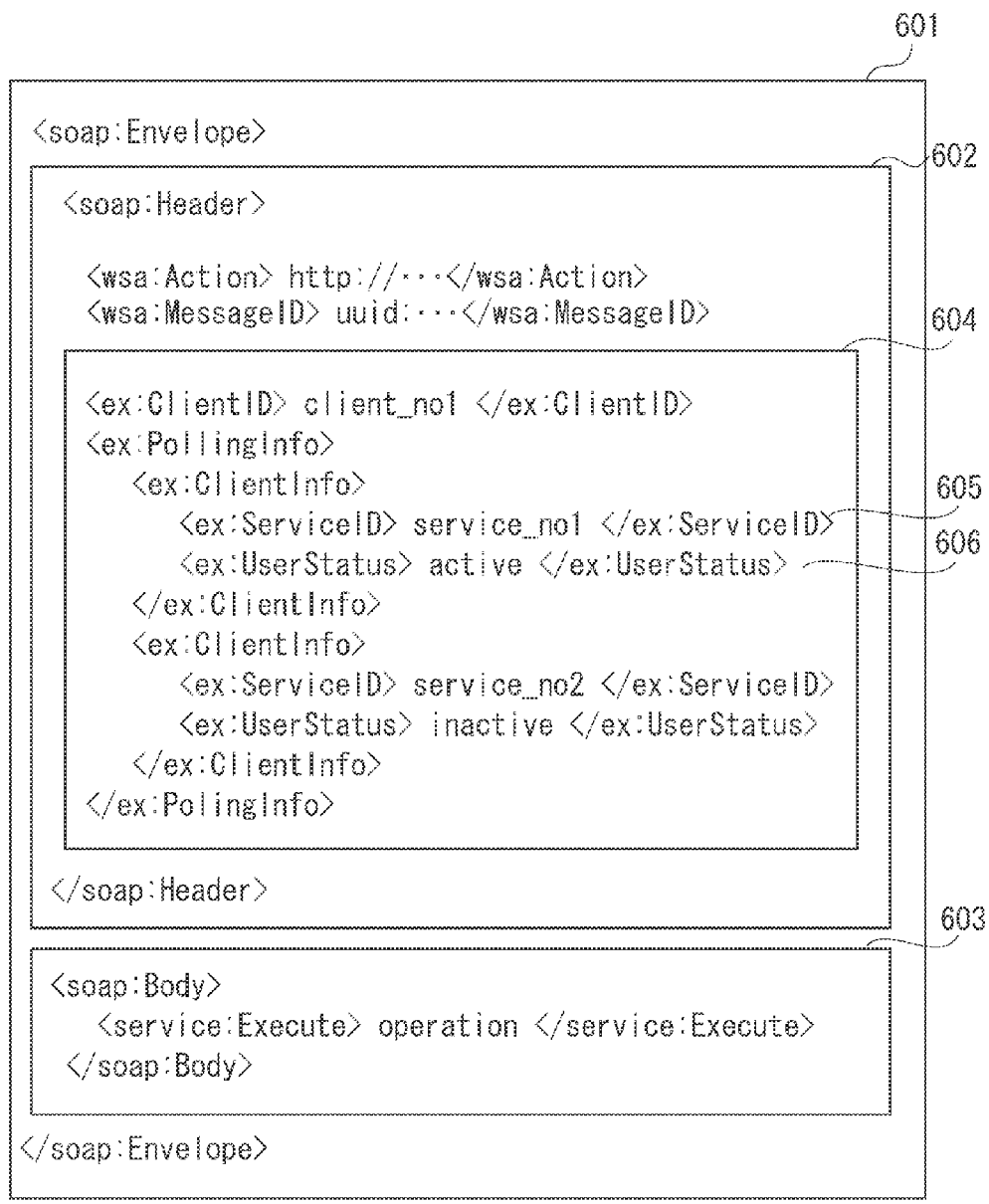
FIG. 5 illustrates an example of a message that is transmitted from the service execution apparatus to the service management apparatus in the event share system according to the exemplary embodiment of the present invention.

FIG. 5 illustrates an example of a Simple Object Access Protocol (SOAP) message that is transmitted from the service execution apparatus 205 to the service management apparatus 209 according to the present exemplary embodiment. Referring to FIG. 5, A SOAP message 601 includes a header portion 602 and a body portion 603. The header portion 602 includes polling information 604. The polling information 604 is information describing an operation status for executing a service by the service execution client 201. More specifically, the polling information 604 includes a service identifier 605 and an operation status of the service 605. In the example illustrated in FIG. 5, the body portion 603 includes a service execution request. However, if the operation status only is to be notified, the body portion 603 may be null.

Figure 6:
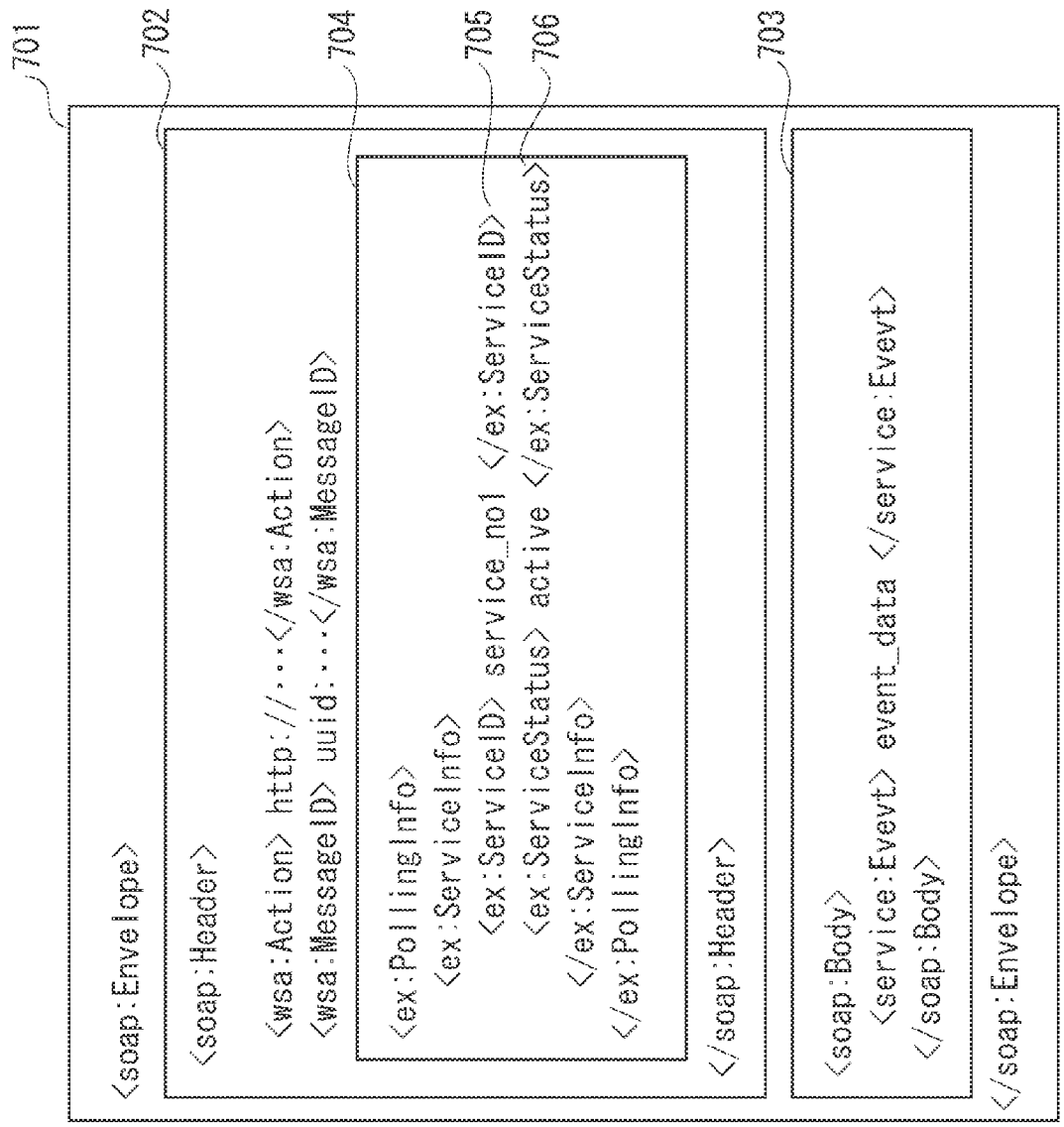
FIGS. 6A and 6B illustrates an example of a message that is transmitted by the service management apparatus in response to polling by an event acquisition apparatus in the event share system according to the exemplary embodiment of the present invention.

FIG. 6A illustrates an example of a SOAP message transmitted from the service management apparatus 209 to the event acquisition apparatus 216. Referring to FIG. 6A, a SOAP message 701 includes a header portion 702 and a body portion 703. The header portion 702 includes polling information 704. More specifically, the polling information 704 describes the operation status of the service by the server 202. The polling information 704 includes a service identifier 705 and an operation status of the service 706. In the example illustrated in FIG. 6A, the body portion 703 includes event information. However, if no event to be notified exists and thus the operation status only is to be notified, the body portion 703 may be null.

Figure 7:
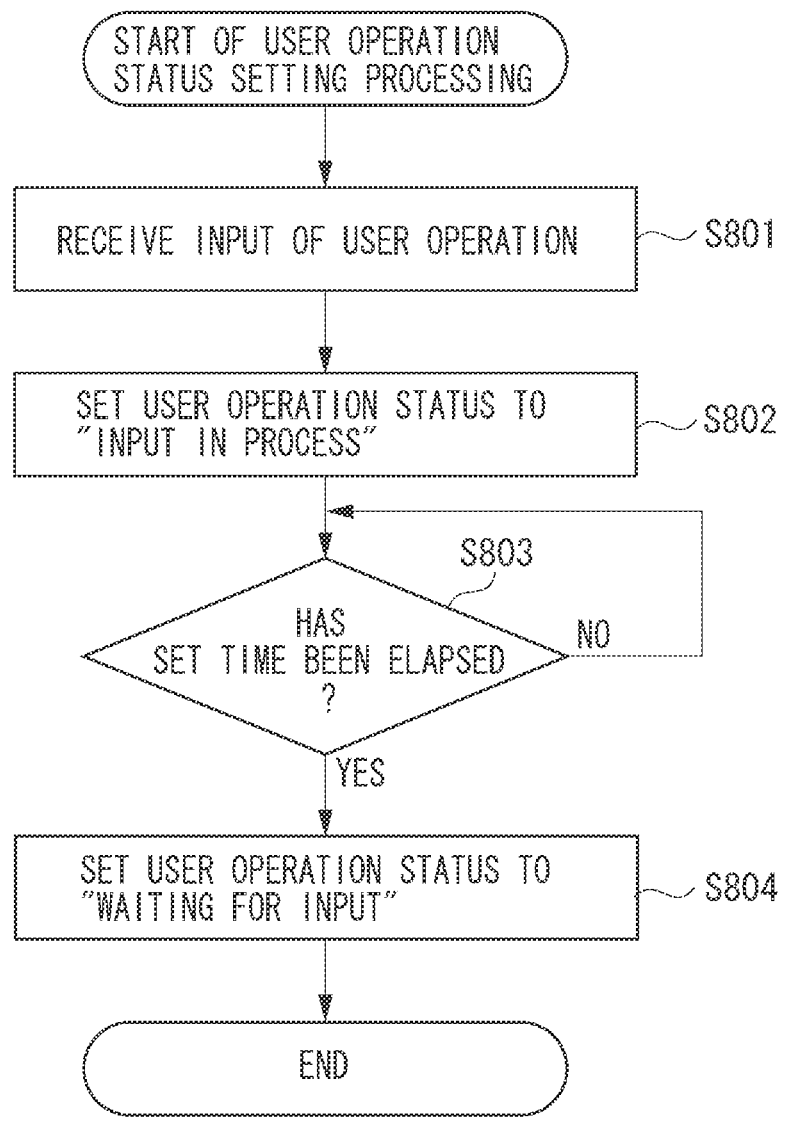
FIG. 7 is a flow chart illustrating an example of operation status setting processing executed by the service execution apparatus.

FIG. 7 is a flow chart illustrating an example of operation status setting processing executed by the service execution apparatus 205 according to the present exemplary embodiment.

Referring to FIG. 7, in step S801, the service execution apparatus 205 receives an input of a user operation for executing a service for the application 204. In step S802, the service execution apparatus 205 sets the operation status of the corresponding service (FIG. 3A) to "input in process". In step S803, the service execution apparatus 205 determines whether a set time has elapsed after receiving an input of a previous user operation on a periodical basis of every minute, for example. If it is determined that the set time has elapsed (Yes in step S803), then the processing advances to step S804. In step S804, the service execution apparatus 205 resets the operation status to "waiting for input".

On the other hand, if it is determined that the set time has not elapsed yet (No in step S803), then the processing repeats the determination in step S803 after a predetermined time has elapsed without changing the operation status "input in process". If the input of the user operation for executing the service for the application 204 is received during counting of the set time, then the set time elapsing after the timing of the input is counted.

By executing the method for setting the operation status in the above-described manner, the operation status "input in process" is maintained while the user executes the operation for executing the service. The service execution apparatus 205 transmits a message for notifying the service management apparatus 209 of the operation status every time the determination in step S803 is executed. In this case, it is useful to transmit the message at an interval separately set.

Figure 8:
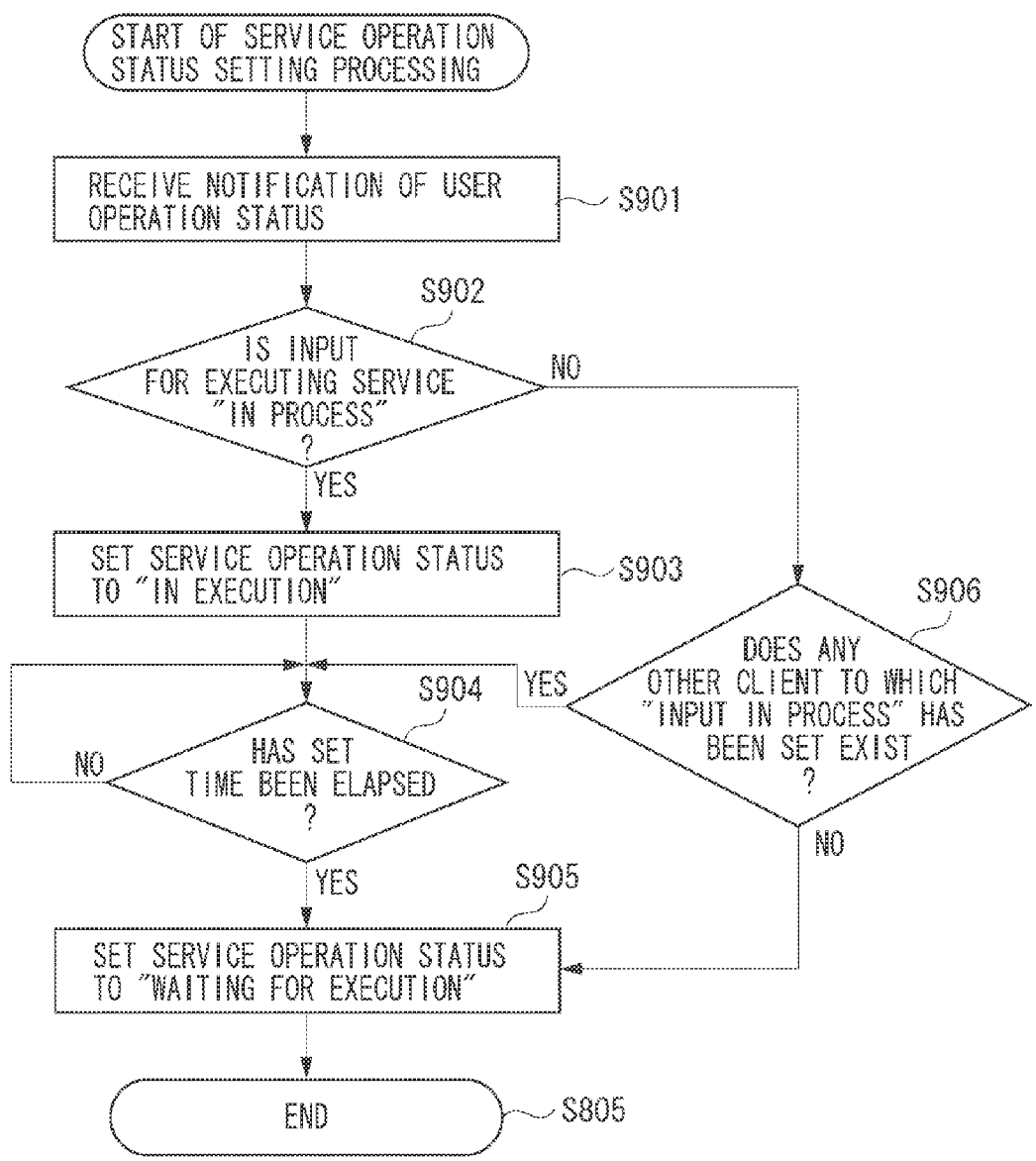
FIG. 8 is a flow chart illustrating an example of operation status setting processing executed by the service management apparatus.

FIG. 8 is a flow chart illustrating an example of operation status setting processing executed by the service management apparatus 209.

Referring to FIG. 8, in step S901, the service management apparatus 209 receives the message for notifying the operation status of each service from the service execution apparatus 205. In step S902, the service management apparatus 209 determines whether the operation status of the service execution apparatus is in process of the input for requesting execution of the service according to the received notification message. In other words, the management unit 212 determines whether the service execution apparatus 205 is in process of the input for requesting execution of the service. If it is determined that the operation status for the service is in process of the input for requesting execution thereof (Yes in step S902), then the processing advances to step S903. In step S903, the service management apparatus 209 sets the operation status of the service (FIG. 3B) to "in execution".

In step S904, the service management apparatus 209 periodically determines whether the set time has elapsed since the timing of receipt of the last notification message whose operation status is "input in process". If it is determined that the set time has elapsed (Yes in step S904), then the processing advances to step S905. In step S905, the service management apparatus 209 resets the operation status to "waiting for execution". The set time (for example, two minutes) is set longer than the interval of transmitting the message that notifies that the service execution apparatus 205 is in process of the input for requesting execution of the service (for example, one minute).

On the other hand, if it is determined that the set time has not elapsed yet (No in step S904), then the service management apparatus 209 repeats the determination in step S904 after a predetermined time has elapsed without changing the operation status "in execution".

On the other hand, if it is determined that the operation status of the service is "waiting for input" (No in step S902), then the processing advances to step S906. In step S906, the service management apparatus 209 determines whether any other client whose operation status of the service is "input in process" exists. If it is determined that any other such client exists (Yes in step S906), then the service management apparatus 209 does not change the operation status "in execution" and executes the determination in step S904. On the other hand, if it is determined that no such other client exists (No in step S906), then the processing advances to step S905. In step S905, the service management apparatus 209 resets the operation status to "waiting for execution".

By executing the method for setting the operation status in the above-described manner, the operation status "in execution" is maintained while a client whose user executes the operation for executing the service exists.

The polling reception unit 214, according to the polling from the event acquisition apparatus 216, transmits the event and the operation status to the event acquisition apparatus 216. The operation status describes whether the service execution apparatus 205 is in process of an input for requesting execution of a service. By setting the operation status to the event acquisition apparatus 216, the service management apparatus 209 executes instruction processing for instructing the interval of the polling executed by the event acquisition apparatus 216. If it is determined that the service execution apparatus 205 is in process of the input for requesting execution of the service, the polling interval is set shorter than the polling interval set if the service execution apparatus 205 is not in process of the input for requesting execution of the service.

Figure 9:
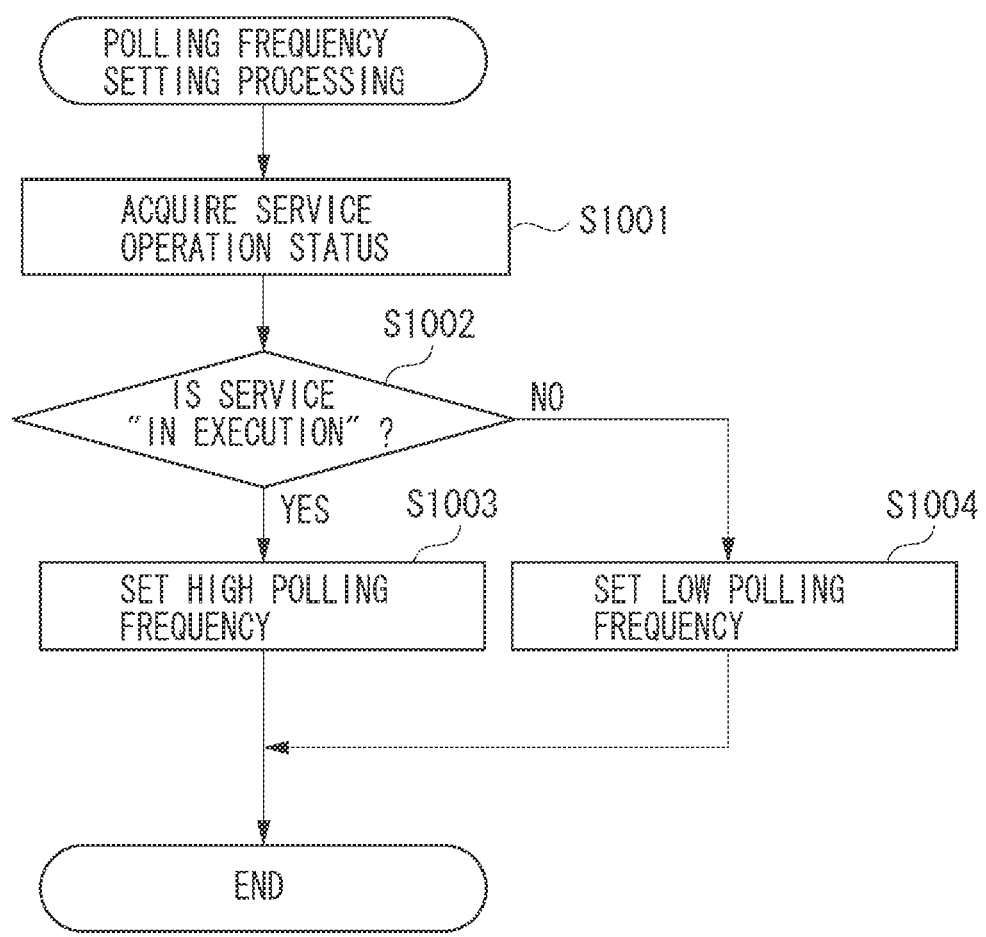
FIG. 9 is a flow chart illustrating an example of processing for setting a polling frequency, which is executed by the event acquisition apparatus according to the exemplary embodiment of the present invention.

FIG. 9 is a flow chart illustrating an example of processing for setting a polling frequency which is executed by the event acquisition apparatus 216 according to the first exemplary embodiment of the present invention.

Referring to FIG. 9, in step S1001, the event acquisition apparatus 216 acquires polling information including the operation status as a reply message to the polling to the service management apparatus 209. In step S1002, the event acquisition apparatus 216 determines the operation status of each service based on the acquired polling information. In other words, in step S1002, the event acquisition apparatus 216 determines whether the operation status of the service is "in execution". If it is determined that the operation status is "in execution" (Yes in step S1002), then the processing advances to step S1003. In step S1003, the event acquisition apparatus 216 sets a high polling frequency for the service whose operation status is "in execution". On the other hand, if it is determined that the operation status of the service is "waiting for execution" (No in step S1002), then the processing advances to step S1004. In step S1004, the event acquisition apparatus 216 sets a low polling frequency. The processing in step S1004 implements reduction processing for reducing the interval.

More specifically, the polling frequency determination unit 218 determines whether the service execution apparatus 205 is in process of the input for requesting execution of the service. If it is determined that the service execution apparatus 205 is in process of the input for requesting execution of the service, then the polling frequency determination unit 218 sets the interval of request of acquisition of the event shorter than the interval of request of acquisition of the event that is set if the service execution apparatus 205 has been determined not to be in process of the input for requesting execution of the service.

A second exemplary embodiment of the present invention will be described in below. In the first exemplary embodiment described above, the event acquisition client 203 determines the polling frequency according to the operation status. In the present exemplary embodiment, the server 202 sets the polling frequency according to the operation status. In addition, the server 202 notifies the event acquisition client 203 of the set polling frequency as polling information.

An exemplary software configuration of an event share system according to the second exemplary embodiment of the present invention will be described in detail below. The hardware configuration of the system according to the present exemplary embodiment is the same as that illustrated in FIG. 1.

In the present exemplary embodiment, the management unit 212 of the service management apparatus 209 calculates the polling frequency. More specifically, the management unit 212 calculates the polling frequency based on the operation status managed by the management unit 212. The polling reception unit 214 acquires polling frequency information from the management unit 212. In addition, the polling reception unit 214 transmits a message to which the polling frequency information is added in reply to the polling from the event acquisition apparatus 216. The polling execution unit 217 executes polling according to the received polling frequency information.

The service execution apparatus 205 is a request apparatus configured to request execution of a service. The service management apparatus 209 is a service execution apparatus configured to execute a service requested by the service execution apparatus 205 via the network 100. The event acquisition apparatus 216 is an event request apparatus (acquisition apparatus) configured to request acquisition of an event that occurs due to execution of the service. The service management apparatus 209 notifies the event acquisition apparatus 216 of a requested event via the network 100.

The service status management unit 212 determines whether the service execution apparatus 205 is in process of an input for requesting execution of a service. If it is determined that the service execution apparatus 205 is in process of the input for requesting execution of the service, then the service status management unit 212 instructs the event acquisition apparatus 216 so that the event acquisition apparatus 216 sets an interval of request of acquisition of the event shorter than an interval of request of acquisition of the event that is set if it is determined that the service execution apparatus 205 is not in process of the input for requesting execution of the service.

FIG. 6B illustrates an example of a SOAP message transmitted from the service management apparatus 209 to the event acquisition apparatus 216 which is executed in the event share system according to the present exemplary embodiment of the present invention. Referring to FIG. 6B, polling information 704 includes polling interval information 1201 to the service corresponding to the service identifier 705.

A third exemplary embodiment of the present invention will be described in below. In the first and the second exemplary embodiments described above, the polling frequency is determined based on the operation status only. In the present exemplary embodiment, the polling frequency is set based on pieces of information, such as an operation status of the event acquisition apparatus, a service priority, and a status of a communication load on the server, as well as based on the operation status. Now, an exemplary method for controlling acquisition of an event according to the present exemplary embodiment will be described in detail below with reference to FIG. 10.

Figure 10:
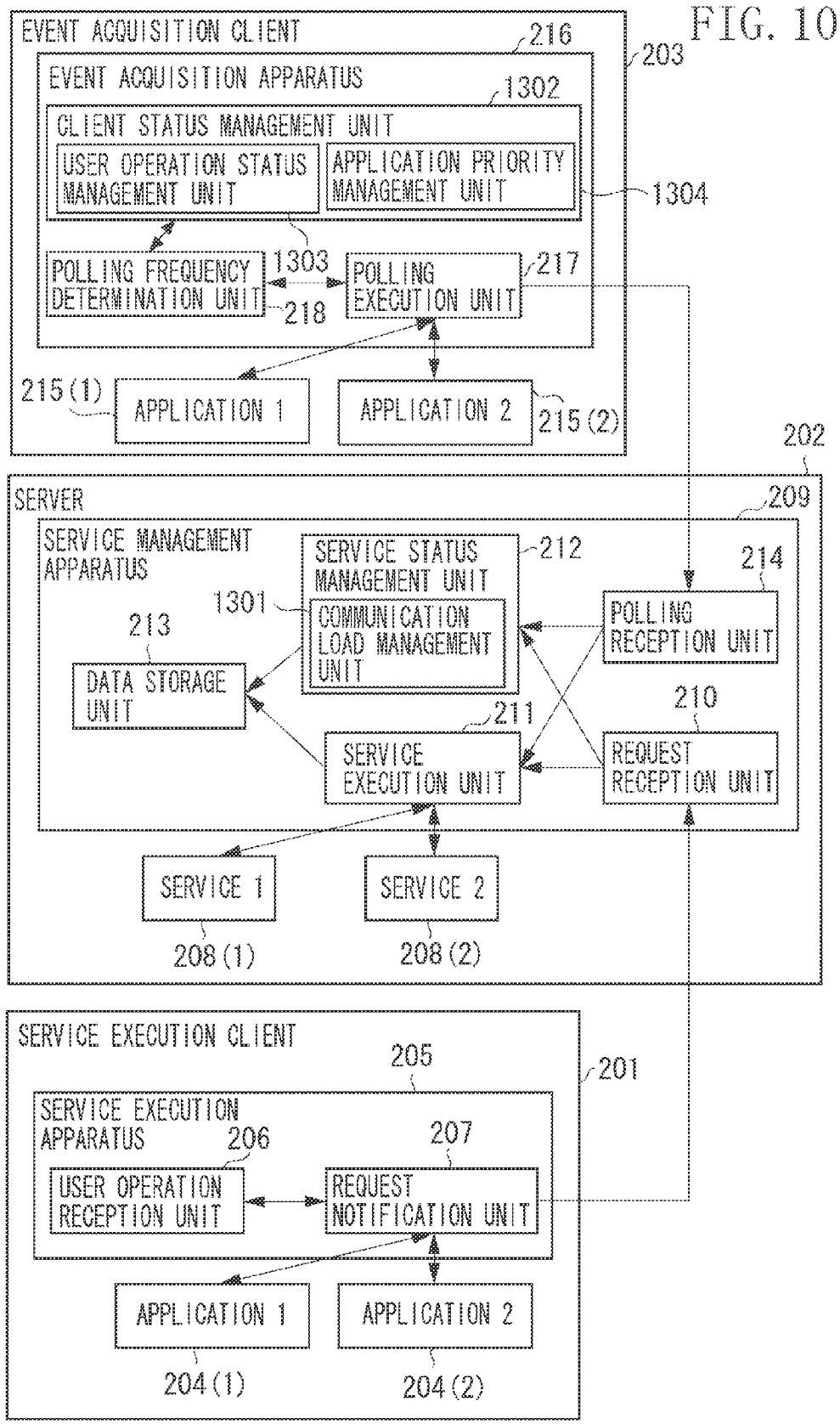
FIG. 10 illustrates an exemplary software configuration of the event share system according to the exemplary embodiment of the present invention.

FIG. 10 illustrates an exemplary software configuration of an event share system according to the third exemplary embodiment of the present invention. In the present exemplary embodiment, the system has a hardware configuration similar to that illustrated in FIG. 1.

Referring to FIG. 10, the management unit 212 of the service management apparatus 209 includes a communication load calculation unit 1301. The communication load calculation unit 1301 manages a communication load status by the polling by the service management apparatus 209. The communication load status is determined based on an amount of data in the communication. After receiving the polling, the polling reception unit 214 acquires the event information managed by the service execution unit 211 and the operation status and the communication load status managed by the service status management unit 212. Further, the polling reception unit 214 adds the above-described information to a message and transmits the message as a reply to the polling.

The event acquisition apparatus 216 includes a client status management unit 1302. The client status management unit 1302 includes an operation status management unit 1303 and an application priority management unit 1304. The operation status management unit 1303 manages information about a current status of an operation executed for acquiring an event (i.e., "acquisition in process" or "waiting for acquisition") for each application. In the present exemplary embodiment, "acquisition in process" refers to a state in which a user operation for acquiring an event is currently executed for the application. On the other hand, "waiting for acquisition" refers to a state in which no such user operation is currently executed. More specifically, the status "acquisition in process" refers to a state in which a user has activated an application that displays data acquired from the service 208. The application priority management unit 1304 manages a priority setting related to acquisition of an event for a service for each application.

The polling frequency determination unit 218 determines the polling frequency based on the operation status notified by the service management apparatus 209 and the operation status and the application priority managed by the client status management unit 1302.

In other words, the service execution apparatus 205 is a request apparatus configured to request execution of a service. The service management apparatus 209 is a service execution apparatus configured to execute a service requested by the service execution apparatus 205. The event acquisition apparatus 216 is an event request apparatus (acquisition apparatus) configured to request acquisition of an event that occurs due to execution of the service via the network 100.

The polling frequency determination unit 218 determines whether the service execution apparatus 205 is in process of the input for requesting execution of the service. If it is determined that the service execution apparatus 205 is in process of the input for requesting execution of the service, then the polling frequency determination unit 218 sets the interval of request of acquisition of the event shorter than the interval of request of acquisition of the event that is set if the service execution apparatus 205 has been determined not to be in process of the input for requesting execution of the service.

Alternatively, in this case, the polling frequency determination unit 218 sets the frequency of request of acquisition of the event that occurs due to the execution of the service for which the service execution apparatus 205 is in process of the input for requesting execution of the service higher than the frequency of request of acquisition of the event that occurs due to the execution of the service for which the service execution apparatus 205 is not in process of the input for requesting execution of the service.

FIG. 11 illustrates an example of a polling frequency setting table which is used for setting a polling frequency by the event acquisition apparatus 218 according to the third exemplary embodiment of the present invention. In the present exemplary embodiment, the polling frequency is set according to the operation status and the operation status and the service priority set to the event acquisition client 203. Referring to FIG. 11, if "in execution" is set to an operation status 1401, "acquisition in process" is set to an operation status 1402, and a priority "high" is set to a service priority 1403, then the present exemplary embodiment executes polling at a highest polling frequency T01. On the other hand, if "waiting for execution" is set to the operation status 1401, "waiting for acquisition" is set to the operation status 1402, and "low" has been set to the service priority 1403, the present exemplary embodiment executes the polling at a lowest polling frequency T12.

In the example illustrated in FIG. 11, the polling frequency setting table includes the operation status 1401, the operation status 1402 of the event acquisition client 203, and the service priority 1403. In addition to using the above-described items included in the polling frequency setting table, in the present exemplary embodiment, a low polling frequency may be set if the communication load is high and a high polling frequency may be set if the communication load is low according to the communication load information notified by the service management apparatus 209.

In the present exemplary embodiment, the service management apparatus 209 includes the service status management unit 212 which manages the status of the server. In addition, the event acquisition apparatus 216 includes the client status management unit 1302 which manages the status of the client. With the above-described configuration, the present exemplary embodiment determines the polling frequency by very effectively using the operation status input for executing a service. In addition, the polling frequency determination unit 218 according to the present exemplary embodiment is capable of determining the polling frequency based on arbitrary information managed by the service status management unit 212 and the client status management unit 1302. In other words, the information used for determination of the polling frequency is not limited to the information described above in the present exemplary embodiment.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In an example, an aspect of the present invention can also be realized by a computer-readable medium having stored thereon, a program that causes an acquisition apparatus to perform a method to acquire an occurred event that occurs due a processing apparatus executing processing requested by a request apparatus. Also, in an example, an aspect of the present invention can also be realized by a computer-readable medium having stored thereon, a program that causes a processing apparatus to perform a method to execute processing as requested by a request apparatus configured to request execution of the processing via a network, and to notify an acquisition apparatus via the network of an occurred event that occurs due to execution of the processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-260107 filed Nov. 13, 2009, which is hereby incorporated by reference herein in its entirety.

What is claimed is:

1. A method for controlling acquisition of an occurred event that occurs in a network system due to the network system executing processing as requested by a request apparatus configured to request execution of the processing via a network, wherein the network system notifies an acquisition apparatus via the network about the occurred event, and wherein the acquisition apparatus is configured to acquire the occurred event, the method comprising:
determining whether the request apparatus is in process of inputting a request to execute the processing from start of input until finalization of the input; and
setting, if it is determined that the request apparatus is in process of inputting the request to execute the processing, a set interval for the acquisition apparatus to acquire the occurred event by executing processing to determine that the request apparatus is in process of inputting the request to execute the processing, wherein the set interval is shorter than an interval that is set if it is determined that the request apparatus is not in process of inputting the request to execute the processing.

2. The method according to claim 1, further comprising:
determining, if a plurality of request apparatuses exists on the network, whether at least one request apparatus of the plurality of request apparatuses is in process of inputting the request to execute the processing; and
setting, if it is determined that at least one request apparatus of the plurality of request apparatuses is in process of inputting the request to execute the processing, a set interval for the at least one request apparatus to acquire the occurred event, wherein the set interval is shorter than an interval that is set if it is determined that none of the plurality of request apparatuses are in process of inputting the request to execute the processing.

3. The method according to claim 1, further comprising:
determining, if a plurality of executable processing exists, whether the request apparatus is in process of inputting the request to execute the processing for each executable processing; and
setting, if it is determined that the request apparatus is in process of inputting the request to execute the processing for each executable processing including a first executable processing, a set interval for the acquisition apparatus to acquire the occurred event that occurs due to the execution of the first executable processing, wherein the set interval is shorter than an interval that is set if it is determined that the request apparatus is not in process of inputting the request to execute the processing for each executable processing.

4. The method according to claim 1, further comprising setting, if it is determined that the request apparatus is in process of inputting the request to execute the processing, a polling interval for acquiring the occurred event, wherein the set interval is shorter than an interval that is set if it is determined that the request apparatus is not in process of inputting the request to execute the processing.

5. An acquisition apparatus that acquires an occurred event that occurs due to a processing apparatus executing processing as requested by a request apparatus via a network, the acquisition apparatus comprising:
a processor coupled to a memory;
a determination unit configured to determine whether the request apparatus is in process of inputting a request to execute the processing from start of input until finalization of the input; and
a setting unit configured to set, if it is determined that the request apparatus is in process of inputting the request to execute the processing, a set interval to acquire the occurred event by executing processing to determine that the request apparatus is in process of inputting the request to execute the processing, wherein the set interval is shorter than an interval that is set if it is determined that the request apparatus is not in process of inputting the request to execute the processing,
wherein at least one of the determination unit and the setting unit is implemented by the processor in the acquisition apparatus.

6. The acquisition apparatus according to claim 5, wherein the determination unit is configured, if a plurality of executable processing exists, to determine whether the request apparatus is in process of inputting the request to execute the processing for each executable processing, and
the setting unit is configured to set, if it is determined that the request apparatus is in process of inputting the request to execute the processing for each executable processing including a first executable processing, a set interval to acquire the occurred event that occurs due to the execution of the first executable processing, wherein the set interval is shorter than an interval that is set if it is determined that the request apparatus is not in process of inputting the request to execute the processing for each executable processing.

7. The acquisition apparatus according to claim 5, wherein the setting unit is configured, if it is determined that the request apparatus is in process of inputting the request to execute the processing, to set a polling interval for acquiring the occurred event, wherein the set interval is shorter than an interval that is set if it is determined that the request apparatus is not in process of inputting the request to execute the processing.

8. A processing apparatus that executes processing as requested by a request apparatus configured to request execution of the processing via a network, wherein the processing apparatus notifies an acquisition apparatus via the network of an occurred event that occurs due to execution of the processing, the processing apparatus comprising:
- a processor coupled to a memory;
- a determination unit configured to determine whether the request apparatus is in process of inputting a request to execute the processing from start of input until finalization of the input; and
- an instruction unit configured to instruct, if it is determined that the request apparatus is in process of inputting the request to execute the processing, the acquisition apparatus to set a set interval for the acquisition apparatus to acquire the occurred event by executing processing to determine that the request apparatus is in process of inputting the request to execute the processing, wherein the set interval is shorter than an interval that is set if it is determined that the request apparatus is not in process of inputting the request to execute the processing,
- wherein at least one of the determination unit and the setting unit is implemented by the processor in the processing apparatus.

9. The processing apparatus according to claim 8, wherein the determination unit is configured to determine, if a plurality of request apparatuses exists on the network, whether at least one request apparatus of the plurality of request apparatuses is in process of inputting the request to execute the processing, and
- the instruction unit is configured to instruct, if it is determined that at least one request apparatus of the plurality of request apparatuses is in process of inputting the request to execute the processing, the acquisition apparatus to set the set interval for the acquisition apparatus to acquire the occurred event, wherein the set interval is shorter than an interval that is set if it is determined that none of the plurality of request apparatuses is in process of inputting the request to execute the processing.

10. The processing apparatus according to claim 8, wherein the instruction unit is configured to instruct, if it is determined that the request apparatus is in process of inputting the request to execute the processing, the acquisition apparatus to set the set interval for the acquisition apparatus to acquire the occurred event, wherein the set interval is shorter than an interval that is set if it is determined that the request apparatus is not in process of inputting the request to execute the processing.

11. A non-transitory computer-readable medium having stored thereon, a program that causes a computer to perform a method to acquire an occurred event that occurs due to a processing apparatus executing processing as requested by a request apparatus, the method comprising:
- determining whether the request apparatus is in process of inputting a request to execute the processing from start of input until finalization of the input; and
- setting, if it is determined that the request apparatus is in process of inputting the request to execute the processing, an interval for requesting acquisition of the occurred event by executing processing to determine that the request apparatus is in process of inputting the request to execute the processing, wherein the set interval is shorter than an interval that is set if it is determined that the request apparatus is not in process of inputting the request to execute the processing.

12. The non-transitory computer-readable medium according to claim 11, further comprising:
- determining, if a plurality of executable processing exists, whether the request apparatus is in process of inputting the request to execute the processing for each executable processing; and
- setting a set interval for the acquisition apparatus to acquire the occurred event that occurs due to the execution of the processing for which the request apparatus is determined to be in process of inputting the request to execute the processing, wherein the set interval is shorter than an interval that is set if the request apparatus has not been determined to be in process of inputting the request to execute the processing.

13. A non-transitory computer-readable medium having stored thereon, a program that causes a computer to perform a method to execute processing as requested by a request apparatus configured to request execution of the processing via a network, and to notify an acquisition apparatus via the network of an occurred event that occurs due to execution of the processing, the method comprising:
- determining whether the request apparatus is in process of inputting a request to execute the processing from start of input until finalization of the input; and
- instructing, if it is determined that the request apparatus is in process of inputting the request to execute the processing, the acquisition apparatus to set a set interval for the acquisition apparatus to acquire the occurred event by executing processing to determine that the request apparatus is in process of inputting the request to execute the processing, wherein the set interval is shorter than an interval that is set if it is determined that the request apparatus is not in process of inputting the request to execute the processing.

14. The non-transitory computer-readable medium according to claim 13, further comprising:
- determining, if a plurality of request apparatuses exists on the network, whether at least one request apparatus of the plurality of request apparatuses is in process of inputting the request to execute the processing; and
- instructing, if it is determined that at least one request apparatus of the plurality of request apparatuses is in process of inputting the request to execute the processing, the acquisition apparatus to set the interval for the acquisition apparatus to acquire the occurred event, wherein the set interval is shorter than an interval that is set if it is determined that all the plurality of request apparatuses are not in process of inputting the request to execute the processing.

* * * * *